United States Patent [19]
Myers et al.

[11] Patent Number: 5,329,773
[45] Date of Patent: Jul. 19, 1994

[54] TURBINE COMBUSTOR COOLING SYSTEM

[75] Inventors: Geoffrey D. Myers, Phoenix; Judy P. Bottlinger, Chandler, both of Ariz.

[73] Assignee: AlliedSignal Inc., Morris Township, Morris County, N.J.

[21] Appl. No.: 401,366

[22] Filed: Aug. 31, 1989

[51] Int. Cl.$^5$ ............................................. F02C 7/12
[52] U.S. Cl. ..................................... 60/759; 60/757
[58] Field of Search ................. 60/265, 754, 755, 757, 60/759, 760

[56] References Cited

U.S. PATENT DOCUMENTS

| | | | |
|---|---|---|---|
| 2,785,878 | 3/1957 | Conrad | 60/754 |
| 3,353,359 | 11/1967 | Webb | 60/265 |
| 3,420,058 | 1/1969 | Howald et al. | 60/757 |
| 3,623,711 | 11/1971 | Thorstenson | 60/754 |
| 3,706,203 | 12/1972 | Goldberg et al. | 60/757 |
| 3,737,152 | 6/1973 | Wilson | 600/757 |
| 3,811,276 | 5/1974 | Caruel et al. | 60/757 |
| 3,995,422 | 12/1976 | Stamm | 60/757 |
| 4,242,871 | 1/1981 | Breton | 60/757 |
| 4,622,821 | 11/1986 | Madden | 60/757 |
| 4,684,323 | 8/1987 | Field | 416/97 R |
| 4,708,750 | 11/1987 | Field et al. | 148/11.5 N |
| 4,773,593 | 9/1988 | Auxier et al. | 239/127.3 |

OTHER PUBLICATIONS

Comparison of Advanced Cooling Concepts Using Color Thermography, G. Myers et al, AIAA Paper No. 85-1289, Jul. 1985.
Evaluation of Laminated Porous Wall Materials for Combustor Liner Cooling, D. Nealy et al, ASME Paper No. 79-GT-100, Dec. 1978.

Primary Examiner—Stephen C. Bentley
Attorney, Agent, or Firm—James W. McFarland; Robert A. Walsh

[57] ABSTRACT

A gas turbine engine has a low cost combustor liner cooling system combining the benefits of high internal heat removal with improved film cooling by employing a large number of strategically positioned, laser-drilled cooling passages. Cooling air flows through these specially tailored passages to absorb heat from the liner prior to injection as a protective film on the interior surface. The passages are set in staggered rows on a thickened portion of the liner and have a rough internal heat transfer surface and an exit with a steep injection angle to evenly distribute the cooling film along the interior surface of the liner.

7 Claims, 1 Drawing Sheet

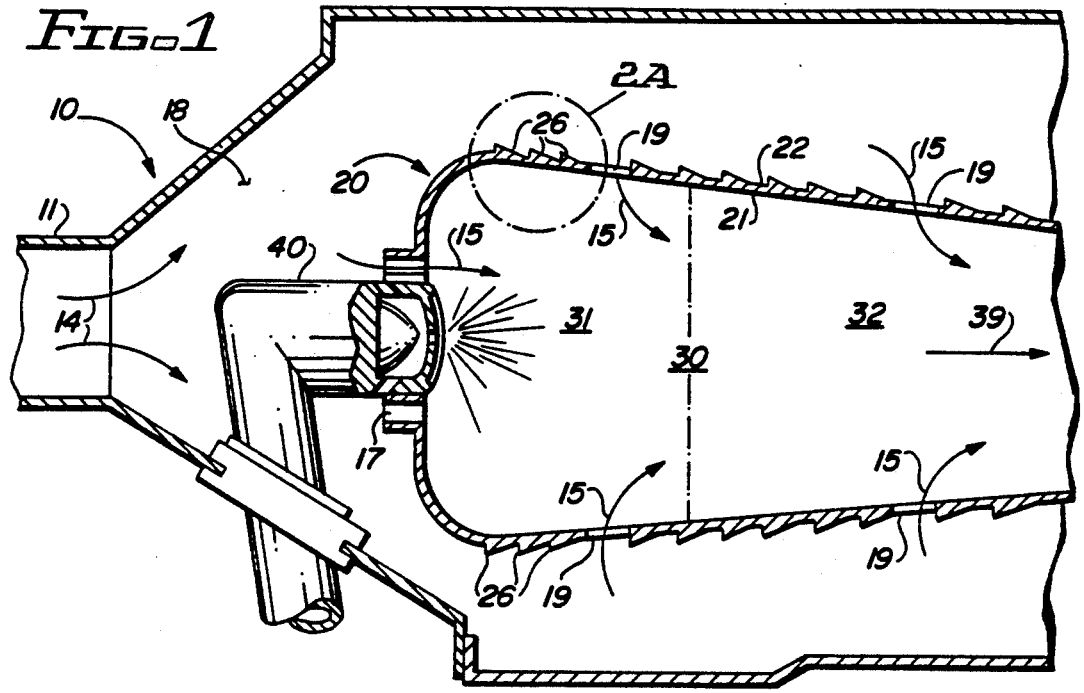
FIG-1
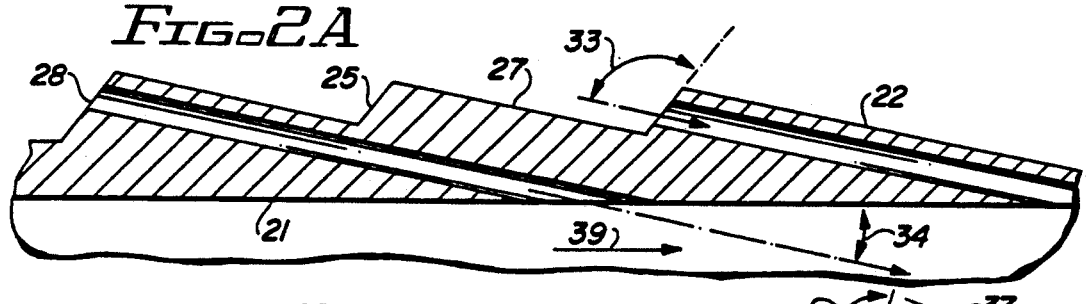
FIG-2A
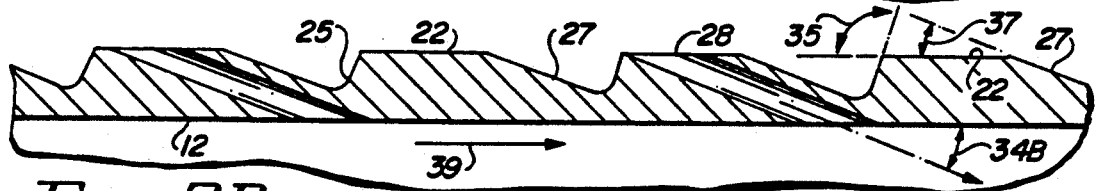
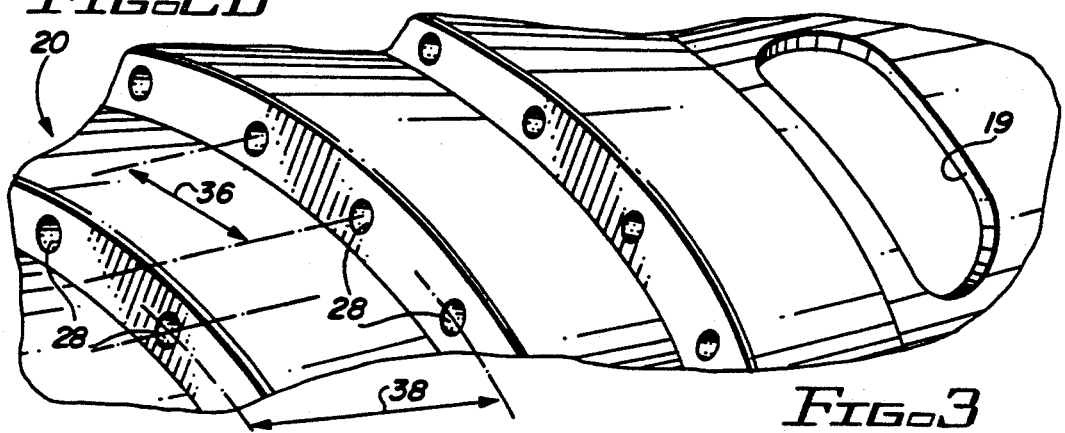
FIG-2B
FIG-3

TURBINE COMBUSTOR COOLING SYSTEM

TECHNICAL FIELD

This invention relates generally to power plants in which combustion products are used as the motive fluid (e.g. gas turbine engines) and more specifically to a cooled porous combustor liner for the gas generator portion of such power plants.

BACKGROUND OF THE INVENTION

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators or hospitals and the like. The same basic power generation principles apply for all of these types of gas turbine power plants. A gas turbine engine in its basic form includes a compressor section, a combustion section and a turbine section arranged to provide a generally axially extending flow path for the working gases. Compressed air is mixed with fuel and burned, and the expanding hot combustion gases are directed against stationary turbine guide vanes in the one or more turbine stages of the engine. The vanes turn the high velocity gas flow partially sideways to impinge at the proper angle upon turbine blades mounted on a turbine disk or wheel that is free to rotate. The force of the impinging gas causes the turbine disk to spin at high speed. The power so generated is then used to draw more air into the engine, in the case of the jet propulsion engine, and both draw more air into the engine and also supply shaft power to turn the propeller, an electric generator, or for other uses, in the cases of the other applications. The high velocity combustion gas is then passed out the aft end of the gas turbine which, in the propulsion engine applications, supplies a forward reaction force to the aircraft.

As is well known, the thermal efficiency, and therefore power, produced by any engine is a function of, among other parameters, the temperature of the working gases admitted into the turbine section. That is, all other things being equal, an increase in power from a given engine can be obtained by increasing the combustion gas temperature. This is particularly true for small turboshaft or turboprop engines where very small changes in the operating temperature can substantially affect the engine output. For example, it has been determined in a typical engine of this type that a single degree centigrade increase in the temperature of the working gases can increase the engine power by as much as 15 horsepower. However, as a practical matter, the maximum feasible gas temperature is limited by the useful operating temperature of the component parts in contact with the motive gas and/or the ability to cool these parts below the hot gas temperature.

The maximum gas temperatures occur in the combustion section. A turbine engine conventionally employs either an annular combustor or several cylindrical combustor cans arranged around the circumference of the turbine to contain the burning fuel and air and to produce energetic hot gases for introduction to the turbine section. A transition duct containing guide vanes is typically disposed between the combustors and the first turbine stage to properly direct the flow of hot gases onto the turbine wheel blades.

Various methods for cooling the walls of these combustor components have been tried in order to allow ever higher gas temperatures to be used. Most methods utilize relatively cool uncombusted air from the engine's compressor to both passively cool the exterior of the walls by convection and to actively protect the interior of the walls by film cooling.

The term film cooling as used herein refers to the technique of cooling a surface by maintaining a relatively slow moving layer or film of cool air near the surface so that the layer acts as an insulative barrier to prevent or retard unwanted heating of the surface by the adjacent hot gas stream. In this context, film cooling is distinguished from the more common convection cooling which operates on the completely different principle of maintaining a relatively high velocity flow of cooling air at a surface to carry heat away from the surface rather than insulating the surface from an adjacent heat source.

Several problems exist with the known cooling methods when applied in smaller high performance gas turbine engines. Simple film cooling through slots and/or louvers in the combustor walls does not utilize the full heat sink potential of the cooling air. Also the amount of air so used represents a significant portion of the total air flow from the compressor which would otherwise be available to support combustion and control the burner exit temperature profile, i.e. eliminate hot spots.

To use cooling air more efficiently, recent attempts have focused on providing film cooling through arrays of holes or passages, as opposed to continuous slots, and constructing the passages to provide more active internal wall cooling by convection or impingement, or both. See, for example, U.S. Pat. Nos. 3,420,058; 3,623,711; 3,737,152; 4,242,871; 4,622,821 and 4,773,593. Such complicated cooling schemes raise new problems to be solved. For example, the uniform hole patterns normally employed can result in wall sections that are undercooled on the leading (upstream) edge, well cooled in some central regions, and overcooled on the trailing edge as the cooling film effectiveness increases from row to row in the streamwise direction. In addition, the typical pressure drop through the combustor walls tends to produce blowing ratios much larger than the ideal value near 0.4. Hence, the effusion jets can separate from the hot surface and mix with the bulk flow rather than forming a protective film near the surface.

In view of the foregoing, it is an object of the present invention to provide an improved cooling system for gas turbine combustor walls.

More specifically, it is an object of the invention to provide a durable but lightweight combustor liner having a more effective array of cooling passages therein.

It is a further object of the invention to provide an efficient method of making a porous combustor liner for advanced gas turbine engines.

SUMMARY OF THE INVENTION

The present invention aims to overcome some of the disadvantages of the prior art as well as offer certain other advantages by providing a novel combination of a contoured combustor liner having rib shaped thickened wall portions and an array of strategically positioned and shaped cooling passages laser-drilled through these thickened wall portions.

Thickened ribs are formed around the circumference of the exterior surface of the otherwise thin metallic liner to add structural strength and to increase the effective heat transfer area of the cold side and of cooling passages drilled at an angle therethrough.

To increase the convective heat transfer from the combustor liner the cooling passages are long and narrow with a length to diameter ratio greater than about 5 and a slightly roughened internal surface.

To reduce non-uniform cooling, the distance between the cooling passages is adjusted, in both the circumferential and axial directions simultaneously, to maintain a relatively uniform cooling effect over the entire surface of the liner. That is, a large number of these cooling passages are arranged in a row in the circumferential direction and a number of rows are increasingly spaced apart in the axial direction such that locally the holes are about equally spaced from one another by a distance which increases in the downstream rows.

The diameter of each cooling passage is reduced as much as possible to minimize the effective area per hole but without increasing the risk of blockage by debris.

To help prevent the cooling film from separating from the interior liner surface, the entering axial momentum of each jet is increased by directing the cooling passages at a steep angle to the hot gas flow direction. The exit of each passage may also be tapered to act as a miniature diffuser to further reduce turbulence and the velocity of the cooling air flowing into the combustor.

BRIEF DESCRIPTION OF THE DRAWINGS

While this specification concludes with claims particularly pointing out and distinctly claiming the subject matter which is regarded as the invention, it is believed that the objects, features, and advantages thereof may be better understood from the following detailed description of a presently preferred embodiment when taken in connection with the accompanying drawing in which:

FIG. 1 is a partial cross-sectional view of a combustor section of a gas turbine engine incorporating the present invention;

FIG. 2A is an enlarged cross-sectional view through the combustor liner of FIG. 1;

FIG. 2B is an alternate cross-sectional configuration for the combustor liner; and FIG. 3 is an enlarged plan view of the exterior surface of the liner of FIG. 2A.

BEST MODE FOR CARRYING OUT THE INVENTION

As an exemplary embodiment of the present invention, FIG. 1 illustrates a partial sectional view of a combustor section 10 of a gas turbine engine. The combustor section 10 includes a generally axially extending, hollow, annular (or sometimes cylindrical) combustion chamber 30 defined by a thin metallic liner 20 in which compressed air is mixed with fuel and burned near the upstream end 31, to provide hot motive gases for the turbine engine. Fuel is supplied to the chamber 30 through several injectors or spray nozzles 40 spaced around the upstream end 31 of the chamber 30 and connected to a suitable fuel control system (not shown). A stream of air 14 from the turbine compressor (also not shown) flows via a duct 11 into either end of a plenum 18 surrounding the combustion chamber 30, through the liner 20 as described below, and into the chamber where it is heated before being discharged in an axial direction 39 from the downstream end 32 to a turbine.

The combustor liner 20 contains several relatively large holes 17 or slots 19 for admitting combustion air 15 into the chamber 30. In addition, the liner 20 of the present invention contains circumferentially disposed reinforcing ribs 26, each of which have a row of small cooling passages 28 drilled at an angle therethrough, as shown in more detail in FIGS. 2A and 2B.

The thin, metallic liner 20 has a generally smooth interior or hot surface 21 to avoid turbulence in the cooling film and a contoured exterior or cold surface 22 to promote turbulence nearby. The cold surface 22 has a number of parallel but spaced apart thickened portions or ribs 26 disposed circumferentially around the liner 20 so as to be substantially perpendicular to the direction of bulk gas flow in the combustor 10. The thickness of the liner 20 is nominally about 0.5 to 1 mm but is increased in the area of each reinforcing rib up to about 1.5 to 3.0 mm. Since the thickened ribs 26 provide structural strength as well as sufficient material to provide for steeply angled cooling passages, as discussed below, the nominal thickness of the liner 20 may be reduced to save weight in the combustor section 10.

As shown in the enlarged sectional view of FIG. 2A, the preferred shape of the ribs 26 is like a saw tooth with a steep upstream facing edge 25, containing the cooling passages 28 which intersect the edge 25 at a steep angle 33 and intersect the hot surface 21 at a shallow angle 34, and a shallower sloped downstream facing edge 27. In an alternate embodiment, useful with reverse flow combustors and shown in FIG. 2B, each of the ribs 26 has an upstream edge 25, which intersects the thickened cold surface 22 at a relatively steep angle 35, cooling passages 28 inclined at an angle 34B to the hot surface 21, and a downstream edge 27, which intersects the cold surface at a relatively shallow angle 37. In both cases the steep angle 35 is preferably between 90° and 120° and most preferably between 95° and 110°. Angle 37 is generally less than 30° but is not critical to the present invention.

Each rib 26 contains a variable number of small cooling passages 28 drilled at an angle through the thickened portion of the liner wall 20. Each passage 28 preferably flares outwardly and intersects the hot wall surface 21 at an angle 34 or 34B of less than 20°, and preferably at 5° to 15° with respect to the direction of hot gas flow 39. It is important that the length-to-diameter ratio of the passage 28 be at least 5 and preferably about 10 so that any air turbulance generated at the passage entrance is not carried through the liner into the cooling film and so that there is sufficient residence time for the air to absorb heat from the liner. The smallest practical diameter for each passage 28 is about 0.5 mm and thus the length of each passage is about 2.5 to 5.0 mm. Preferably, the passage is made with a slightly roughened surface along its length by laser drilling to aid convective heat transfer.

As shown in FIG. 3, the passages 28 are drilled so that the circumferential distance 36 between adjacent passages 28 in one row is approximately equal to the axial distance 38 between rows. Since the passages in each row are preferably staggered (or offset circumferentially by one half the spacing 36) from the passages in adjacent rows, each passage 28 is surrounded by an equal volume of liner material so that its heat sink effect is evenly distributed to avoid hot or cold spots. In a preferred cooling pattern, the spacing between holes 36, 38 is about four times the diameter of each hole (e.g. 2 mm) in the hotter areas of the combustor 30 near the upstream end 31 and about 20 times (e.g. 10 mm) in the cooler areas near the downstream end 32. This decrease in hole density, while maintaining a locally constant spacing, prevents overcooling of the downstream end 32 of the liner 20 due to accumulation in cooling film thickness.

During operation of the turbine, a portion (about 10-15%) of the relatively cool air from the plenum 18 surrounding the combustion chamber 30 flows along the exterior surface 22 of the liner wall 20 and through the small cooling passages 28 thereby removing heat from the wall 20 by convection. The majority of the air 15 flows through the holes 17 and slots 19 to support combustion. The air flowing from the cooling passages 28 is directed at a very shallow angle 34 along the hot interior surface 21 of the liner 20 to provide a film of relatively cool air between it and the much hotter combustion gases in chamber 30. Since additional air is added to the film from passages 28 in the next downstream rib 26, it is important that the location of the cooling passages 28 be staggered or offset circumferentially from the passages in the preceeding and following rib as shown in FIG. 3 so as to more evenly distribute the cooling air across the hot surface 21. In addition, the number of cooling passages 28 is reduced and the spacing 38 between the ribs 26 is increased in the downstream direction in order to prevent overcooling of those portions of the liner 20.

The liner 20 of the present invention is manufactured by first forming the raised ribs 26 on one surface of a thin superalloy sheet by any of the well-known methods such as stamping or coining, etc. The sheet or several sheets are then formed into the desired combustor shape, typically a generally annular hollow ring, with the ribs on the exterior surface 22.

The cooling passages 28 are drilled through the ribs 26 by multiple pulses from a high energy beam, such as a laser beam. The formed liner is positioned under the beam so a row of passages 28 may be drilled in each rib by rotating the liner about its longitudinal axis. The liner is then moved axially to drill the other downstream ribs. Preferably, the passages are drilled into the angled upstream edge 25 of the rib 26 as shown in FIG. 2A in order that the laser beam may be directed about perpendicularly (i.e. 60° to 90°) to the metallic surface. This reduces beam reflections and increases the drilling efficiency of the first laser pulse (by about 50%) at each location of a cooling passage 28. However, the angle of beam incidence may be as low as about 20°, as shown in FIG. 2B, if some deterioration in hole quality can be tolerated. While not preferred, the alternate configuration shown in FIG. 2B may be made by drilling the passages 28 from the hot surface 21 so that the beam entrance will have a slightly flared shape to compensate for the steeper injection angle 34 required. That is, it is not possible to use a laser to drill holes at angles of less than about 20° to the metallic surface. By using multiple pulses of the laser beam, the cooling passages may easily be formed with a slightly roughened internal surface to improve heat transfer to the cooling air. In addition, laser drilling provides high production rates at relatively low cost.

Another major advantage of the present invention is the ability to tailor the cooling effectiveness according to variations found in the hot gas temperature during testing by simply drilling additional cooling passages in the ribs of the hotter areas.

While in order to comply with the statutes, this present invention has been described in terms more or less specific to one preferred embodiment, it is expected that various alterations, modifications, or permutations thereof will be readily apparent to those skilled in this art. Therefore, it should be understood that the invention is not to be limited to the specific features shown or described but it is intended that all equivalents be embraced within the spirit and scope of the invention as defined by the appended claims.

What is claimed is:

1. A gas turbine engine combustor of the type disposed in an air supply plenum and adapted to receive air and fuel at one upstream end and discharge hot motive gases from the other downstream end comprising:
   a generally cylindrical thin metallic liner having a smooth interior surface exposed to a flow of hot motive gases and a contoured exterior surface exposed to a flow of cooling air in said air supply plenum;
   said contoured exterior surface having an axially spaced series of thickened ribs, each extending outwardly therefrom and substantially completely around the circumference of said generally cylindrical liner, the distance between the ribs of said axially spaced series increasing in the direction of flow of said hot motive gases; and
   a number of small diameter cooling passages drilled through said ribs at a shallow angle to the flow of hot motive gases, said number decreasing in each rib downstream from the first of said series of ribs whereby the circumferential spacing between passages in each rib is about equal to the axial spacing between adjacent ribs.

2. The combustor of claim 1 wherein each of said ribs has an upstream edge intersecting said exterior surface at a sharp angle and said cooling passages are drilled substantially perpendicularly therethrough.

3. The combustor of claim 2 wherein said sharp angle is between about 95° to 110° and said cooling passages have a length to diameter ratio of more than five.

4. The combustor of claim 1 wherein said circumferential spacing is about four to twenty times the diameter of said cooling passages at least over a portion of said liner.

5. The combustor of claim 1 wherein each of said cooling passages has a length to diameter ratio of at least about five.

6. The combustor of claim 1 wherein said cooling passages are arranged to direct cooling air into the combustor at an angle of less than about 20° to the interior surface.

7. The combustion liner of claim 1 wherein the cooling passages in one rib are staggered from the passages in each adjacent rib.

* * * * *